United States Patent [19]
Posner

[11] 3,969,175
[45] *July 13, 1976

[54] METHOD OF MAKING A HEAT TRANSFERABLE MOLD SECTION

[75] Inventor: Richard Posner, East Northport, N.Y.

[73] Assignee: Creative Polymer Products Co., Bayshore, N.Y.

[*] Notice: The portion of the term of this patent subsequent to Dec. 11, 1990, has been disclaimed.

[22] Filed: Oct. 15, 1974

[21] Appl. No.: 514,768

[52] U.S. Cl.................................. 156/221; 156/242; 264/135; 264/220; 264/338
[51] Int. Cl.² ......................................... B29C 1/04
[58] Field of Search.................... 264/220, 225–227, 264/325; 156/221, 242

[56] References Cited
UNITED STATES PATENTS

| | | | |
|---|---|---|---|
| 3,251,319 | 5/1966 | Kaupert | 264/220 X |
| 3,424,635 | 1/1969 | Grandinetti | 264/220 X |
| 3,778,323 | 12/1973 | Posner | 264/220 X |
| 3,788,931 | 1/1974 | Hynes | 264/324 X |

*Primary Examiner*—Richard R. Kucia
*Attorney, Agent, or Firm*—Hane, Baxley & Spiecens

[57] ABSTRACT

A mold section is made by covering at least the surface of a cavity of a metallic substrate with a layer of plastic barrier material. A pattern is then placed on this so-covered surface. A compressive force and heat are applied to the metallic substrate and pattern causing the material of the layer to flow and then become bonded to the surface of the cavity while duplicating the surface and shape of the pattern.

9 Claims, 4 Drawing Figures

METHOD OF MAKING A HEAT TRANSFERABLE MOLD SECTION

This invention pertains to the making of molds and more particularly to the making of molds for casting and/or molding plastics or other moldable materials.

Present metal molds for producing plastics are either made by engraving or machining or casting, or combinations of the above. Such molds, by the very nature of construction, are very expensive and take a considerable time to make.

In order to amortize the fabrication costs, the mold must be used for large runs or the cost per finished product must be high. Therefore, such molds have limited applications. In order to broaden the field of use, cheaper molds are required.

This need has been particularly satisfied by my U.S. Pat. No. 3,778,323. However, the molds made under this patent have created a demand for molds which have good heat transfer properties and temperature controllability since during the molding cycles of many plastics there are required large changes in temperature within the mold.

It is accordingly, a general object of the invention to provide an improved method of making mold sections.

It is another object of the invention to provide an improved method of making mold sections with good heat transfer characteristics.

It is a further object of the invention to provide a method of making mold sections with non-sticking barrier surfaces.

It is yet another object of the invention to provide a method of making metal backed mold sections which saves considerable time and money when compared with presently available methods.

Other objects, features and the advantages of the invention will be apparent from the following detailed description when read with the accompanying drawing which illustrates steps for practicing the invention.

Figure 1:
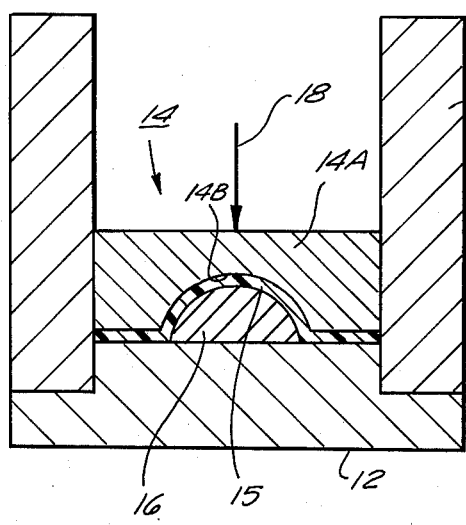
FIG. 1 shows a step in the making of a mold section according to the invention.

In FIG. 1, there is shown a retainer ring 10 in the form of a hollow cylinder of metal with a bottom plate 12 of metal which acts as a pressure base sealer. Within the enclosure, so defined, will be placed a mold substrate 14 comprising slab 14A of a heat conducting metal in which there has been roughly cut or cast a cavity 14B which generally defines the mold cavity.

Because the particular plastic which is to be cast or molded in the mold can cause sticking to the metal or can chemically attack the metal, the mold is permanently lined with a barrier layer. Typical layers can be of films of Nylon, polyvinyl chloride or polyvinyl fluoride. However, unusually good results have been obtained with material containing polymers of tetrafluoroethylene and in particular a copolymer of tetrafluoroethylene and hexafluoropropylene, or a copolymer of tetrafluoroethylene and fluorinated ethylene propylene.

Hence, the circular slab 14A or at least the surface of cavity 14B thereof is lined with a plastic sheet 15 prior to its insertion in the retainer ring 10. Either the back of sheet 15 or the bottom of slab 14A and preferably both are coated with a bonding agent which is activated by at least heat and/or pressure. Typical bonding agents are Chemlock 220 and Chemlock 234 made by Hughson Chemical Company of Erie, Pa. When the sheet 15 is a material including tetrafluoroethylene, the surface which will contact the slab 14A is etched either mechanically, chemically or by other means. Materials such as ACLAR made by Allied Chemical Co., KEL-F made by Minnesota Mining and Manufacturing Co., require a mechanical or chemical etching. However, Teflon-FEP (copolymer of tetrafluoroethylene and flourinated ethylene propylene) manufactured by DuPont is "etched" during its manufacture and does not require the usual mechanical or chemical etching.

Before the slab 14A of substrate 14 carrying the sheet 15 is placed in the ring 10 the model or pattern is placed on bottom plate 16 to align with cavity 14B of substrate 14. The substrate 14 is then placed in ring 10 as shown in FIG. 1.

Next, a positive pressure indicated by arrow 18 is applied to the pattern 16 and substrate 14. When the sheet 15 includes a tetrafluoroethylene polymer, the pressure can first be applied without heating so that it can "cold flow" to the desired contours. However, preferably heat is applied as long as the temperature is below the activation temperature of th bonding agent. When heat is applied to the retainer ring assemblage the film material softens and flows to completely conform to the pattern 16. Finally sufficient heat is applied to activate the bonding agent.

Thereafter, the heat and pressure source is opened and the slab and the pattern are removed.

An alternative possibility does not require the use of bonding agent. In this case at least the surface of cavity 14B is mechanically abraded before sheet 15 is applied thereto. Then when heat and pressure are applied, the sheet material flows into the abrasions to form a mechanical bond.

Figure 2:
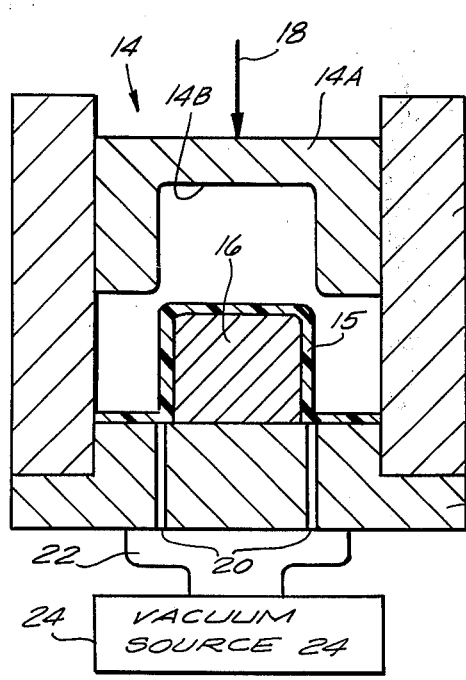
FIG. 2 shows a step in the making of a mold section wherein the barrier film is preformed.

If deep draws or detailed profiles are required for the mold, it is desirable to preform the sheet 15 which acts as a barrier layer. FIG. 2 shows the making of a mold section with a preformed sheet. Since most of the elements are the same as those of FIG. 1, the same reference numerals will be used for like elements.

In particular, the pattern 16 is placed on bottom plate 12 which includes vents 20 connected via manifold 22 to a vacuum source 24. The sheet 15 is then placed over the pattern 16 and base plate 12. Heat from a source (not shown) is applied to the sheet 15. When the sheet is softened the vacuum is applied to suck the sheet 15 about the pattern 16. Thereafter, substrate 4 is placed on the sheet 15 as shown in FIG. 2. Again, heat is applied to cause the material of sheet 15 to soften and a compression force is applied to force the material to flow to fill the contours of the model. Thereafter, sufficient heat is applied to activate the bonding agent. In this embodiment, at least one and preferably both of the abutting surfaces of the slab and sheet are coated with the above-described bonding agent. Therefore, care should be taken that the temperature of the assemblage be kept below the activating temperature of the bonding agent until final flow of the sheet is achieved.

Figure 3:
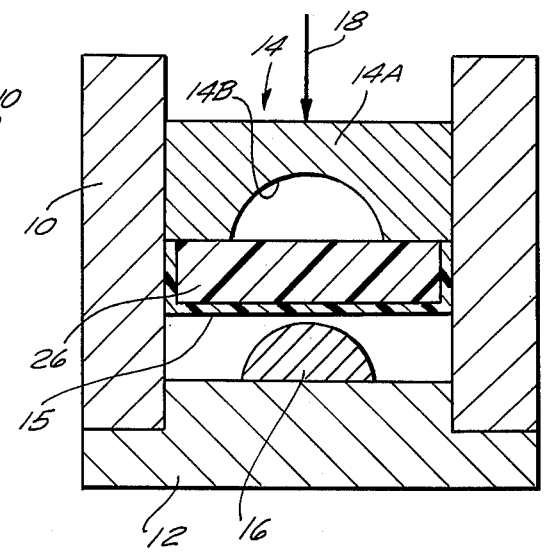
FIG. 3 shows a step in the making of a mold section wherein a polymerizable layer is utilized between the barrier layer and the substrate.

In FIG. 3 there is shown a step in the making of a mold section wherein very deep surface detail is required. Again, since most of the elements are the same as in FIG. 1 and 2, like reference characters will be used. In particular, the model 16 is placed on bottom plate 12 within ring 10. Then a slab 26 will be placed in the ring.

The slab 26 is of a preformed polymerizable type material which is flowable under at least pressure. Such materials can be either elastomeric or not. If the materials are elastomeric they can be, for example, natural rubbers, elastomeric-type rubbers such as Viton, Neoprene or any such synthetic rubber in an unvulcanized or unpolymerized state. If the materials are not elastomeric, they can be polymerizable plastics such as epoxy, phenolic of Sheet Polyester Molding Compound (SMC), or bulk molding compound polymerizable polyesters made by the Marco Division of W. R. Grace Co. It should be noted that the type of mold to be made can dictate a choice of materials.

Because the particular plastic which is to be cast by the mold can cause sticking to the mold or can chemically attack the mold section, the mold section is permanently lined with a film or sheet 15 which acts as a barrier layer. Typical films are those described with respect to FIGS. 1 and 2.

Therefore, the slab 26 is lined with the sheet 15 prior to its insertion in the retainer ring. In FIG. 3 there is shown such an assemblage. Either the back of sheet 15 or the bottom and sides of slab 26 and preferably both are coated with a bonding agent which is activated by at least heat. The bonding agents are the same as those described with respect to FIGS. 1 and 2. When the barrier film contains a material including tetrafluoroethylene, the surface which will contact the slab 26 is etched either mechanically, chemically or by other means. However, Teflon-FEP-C grade, manufactured by Dupont is etched during its manufacture and does not require the usual mechanical or chemical etching. Then the substrate 14 with a suitable cavity 14B is placed on slab 26. However, before this occurs the contacting surfaces between the substrate 14 and slab 26 are treated to insure a bonding. The treatment can be the same as described for FIGS. 1 and 2, i.e., the use of bonding agents or the mechanical abrading of the substrate 14. Next, a positive pressure in th direction of arrow 18 is applied to the substrate 14. When the barrier film contains tetrafluoroethylene or the like, the pressure can first be applied without heating so that the material of slab 26 and the sheet 15 can "cold flow" to the desired contours. However, preferably heat is applied as long as the temperature is below the activation temperature of the bonding agent. The polymerizable material of slab 26 softens and flows occupying all voids. The positive pressure is applied during the heating and cooling cycle. It should be noted that the polymerizing time, temperature and pressure are determined by the type of material used and such parameters are well known.

Thereafter, the heat and pressure source is opened and the slab and the pattern are removed.

Figure 4:
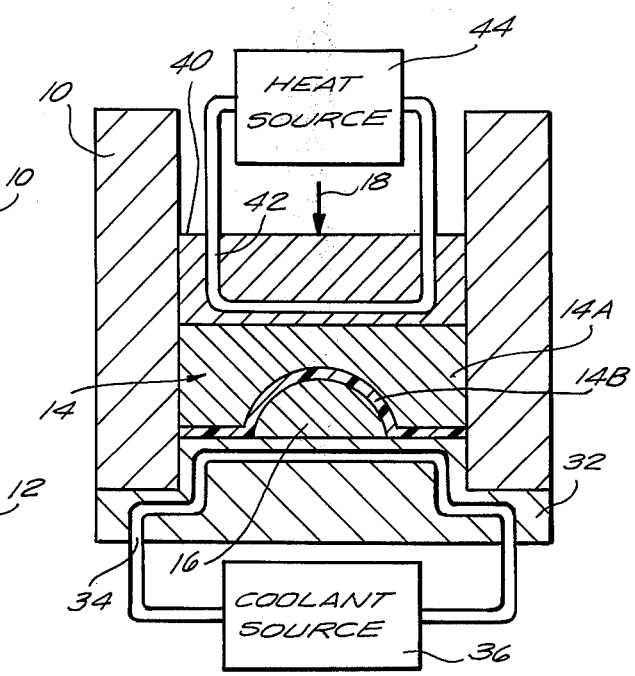
FIG. 4 shows a step in the making of a mold section in accordance with the preferred embodiment of the invention.

According to the preferred embodiment of the invention there is shown in FIG. 4 a method for making a mold section which requires no bonding of a plastic film to the substrate. Instead, the invention exploits the fact that when polymers of tetrafluoroethylene are brought to a molten state under pressure they act as adhesives. This phenomenon particularly occurs for materials which are copolymers of tetrafluoroethylene and hexafluoropropylene, and which are copolymers of tetrafluoroethylene and fluorinated ethylene propylene. As shown, in FIG. 4, where elements similar to those used in the previous Figures have the same reference numerals, there is a mold making assemblage comprising a ring 10, a bottom plate 32, and a piston plate 30. The bottom plate 32 is provided with ducts 34 connected to a coolant source 36 so that coolant flows through the ducts to maintain the top surface of the bottom plate 32 at a predetermined temperature. Similarly, piston plate 40 is provided with ducts 42 connected to heat source 44 so that a hot fluid flows through the ducts 42 to maintain bottom surface or plate 40 at a predetermined temperature. Resistance heating can also be used.

When the mold section is to be made a model or pattern 16, preferably of a good heat conducting material such as a metal is placed on bottom plate 32. Then a sheet 15 of material containing the tetrafluoroethylene is placed over the model 16. The sheet may or may not be preformed in accordance with the drawing characteristics of the model. Then the substrate 14 comprising a slab 14A of metal with a cavity 14B generally conforming to the model is pressed down as indicated by arrow 18. At first a low temperature heat is applied from heat source 44 without coolant from source 36 to permit the sheet to cold flow and conform to model 16. Then more heat is applied to piston plate 40 while coolant is applied to bottom plate 32. Sufficient coolant is used so that the surface of sheet 15 which abuts model 16 and bottom plate 32 remains below the melting point of the material of the sheet. At the same time sufficient heat is applied to piston plate 40 so that the surface of the material of sheet 15 which abuts substrate 14 is at or above the melting point of the material of the sheet. Thereafter, heat source 44 is deactivated and coolant can also pass though ducts 42 so that the substrate 14 and the barrier film cool. Then the mold section comprising substrate 14 with barrier film rigidly fixed thereto can be removed. The surface area of the substrate 14 can be increased and mechanical bond aided by sand blasting or abrading such surface.

As a variation of this embodiment one could use a powdered version of the tetrafluoroethylene polymer instead of a sheet version. In addition, in either case, instead of using a coolant source, one could initially cover the bottom plate and the model with a parting compound such as talc or graphite.

Finally, it should be noted that for all embodiments the cavity 14B of the substrate can roughly conform to the model, but the amount of barrier film material used should be sufficient to completely fill the gap between the substrate and the model and bottom plate so that when the pressure is applied to the substrate the pressure is exerted uniformly throughout the barrier film in the gap. In fact, it may be desirable to use an excess of film material and provide a passageway in ring 10 for expelling the excess when pressure is applied.

Although only a limited number of embodiments of the invention have been shown and described in detail there will now be obvious to those skilled in the art many modifications and variations satisfying many or all of the objects of the invention but not departing from the spirit thereof.

For example, only one-section molds have been shown and described in detail. However, it should be realized that the invention also contemplates split-and-multisection molds.

What is claimed is:

1. The method of making a mold section for an object comprising the steps of making a cavity in a slab of metal, the size of said cavity being greater than the item to be molded, abutting a pre-etched surface of a sheet of plastic material which is flowable under heat and pressure against the surface of said cavity, at least one of said surfaces being initially coated with a heat activatable bonding agent, abutting a pattern of the object against the exposed surface of said sheet in said cavity, initially applying a sufficiently compressive force to said sheet via said pattern and said slab at a first temperature below the temperature for activating said heat activatable bonding agent for a period of time to permit said sheet to cold flow to its final surface whereby said sheet is deformed to conform to said pattern and thereafter applying heat with sufficient temperature to activate said heat activatable bonding agent to cause said sheet to adhere to said slab.

2. The method of claim 1 wherein the plastic material includes a polymer tetrafluoroethylene.

3. The method of claim 2 wherein the plastic material also includes hexafluoropropylene.

4. The method of claim 2, wherein the plastic material also includes fluorinated ethylene propylene.

5. The method of claim 1 wherein said sheet of plastic material is initially at least partially preformed to the shape of the pattern before being abutted against said slab.

6. The method of claim 1 wherein both the surface of said cavity and said pre-etched surface are coated with said heat activatable bonding agent.

7. The method of claim 1 wherein the surface of said cavity is abraded.

8. The method of claim 1 further comprising the steps of interposing an interface slab of polymerizable material between said slab of metal and said sheet of plastic material, said interface slab having at least the surface opposite said sheet of plastic material covered with a heat activatable bonding agent.

9. The method of claim 8 wherein at least the surface of the cavity or the surface of the interface slab opposite thereto is coated with a heat activatable bonding agent.

* * * * *